US011057283B2

(12) United States Patent
Haag et al.

(10) Patent No.: US 11,057,283 B2
(45) Date of Patent: Jul. 6, 2021

(54) SERVICE CREATION WITHIN A TELECOMMUNICATIONS NETWORK IN ORDER TO PROVIDE AUTOMATED COMMUNICATION SERVICES TO CLIENT DEVICES BEING CONNECTED TO THE TELECOMMUNICATIONS NETWORK (71) Applicant: Deutsche Telekom AG, Bonn (DE)

(72) Inventors: Thomas Haag, Rodgau (DE); Hans-Joerg Kolbe, Darmstadt (DE)

(73) Assignee: DEUTSCHE TELEKOM AG, Bonn (DE)

( * ) Notice: Subject to any disclaimer, the term of this patent is extended or adjusted under 35 U.S.C. 154(b) by 253 days.

(21) Appl. No.: 15/710,855

(22) Filed: Sep. 21, 2017

(65) Prior Publication Data

US 2018/0091385 A1 Mar. 29, 2018

(30) Foreign Application Priority Data

Sep. 23, 2016 (EP) .................... 16 190 318

(51) Int. Cl.
H04W 12/06 (2021.01)
H04L 12/24 (2006.01)
(Continued)

(52) U.S. Cl.
CPC ...... H04L 41/5054 (2013.01); H04L 41/0809 (2013.01); H04W 12/06 (2013.01);
(Continued)

(58) Field of Classification Search
CPC ............ H04L 41/5054; H04L 41/0809; H04L 41/0213; H04L 41/044; H04L 63/02;
(Continued)

(56) References Cited

U.S. PATENT DOCUMENTS 8,693,374 B1 * 4/2014 Murphy .................. H04L 12/28
370/255
9,635,663 B2 * 4/2017 Murphy ................ H04W 24/04
(Continued)

FOREIGN PATENT DOCUMENTS

EP 1185116 A2 3/2002

OTHER PUBLICATIONS

Rashid Mijumbi et al: "Network Function Virtualization: State-of-the-art and Research Challenges", IEEE Communications Surveys & Tutorials, Jan. 26, 2015 (Jan. 26, 2015), XP055239665.

Primary Examiner — Aftab N. Khan
(74) Attorney, Agent, or Firm — Leydig, Voit & Mayer, Ltd.

(57) ABSTRACT

A method for improved service creation within a telecommunications network includes the following steps: in a first step, a resource-up-message is received by a corresponding specific central access port of at least one point of delivery; in a second step, subsequent to the first step, a lookup request is transmitted to at least one central database, the lookup request comprising port identification information of a specific physical access resource and/or device identification information and/or subscriber identity module identification information and/or user identification information; and in a third step, subsequent to the second step, database response information is received by the at least one point of delivery, the database response information being related to customer identification information and/or to service attributes information of a communication service or a plurality of communication services to be configured.

9 Claims, 1 Drawing Sheet (51) Int. Cl.
*H04W 12/08* (2021.01)
*H04L 29/06* (2006.01)

(52) U.S. Cl.
CPC ......... *H04W 12/08* (2013.01); *H04L 41/0213* (2013.01); *H04L 41/044* (2013.01); *H04L 63/02* (2013.01); *H04L 63/08* (2013.01); *H04L 63/10* (2013.01)

(58) Field of Classification Search
CPC ........ H04L 63/08; H04L 63/10; H04W 12/06; H04W 12/08
See application file for complete search history.

(56) References Cited

U.S. PATENT DOCUMENTS

| | | | |
|---|---|---|---|
| 2015/0172136 A1* | 6/2015 | Tang | H04L 41/5054 709/226 |
| 2015/0332351 A1 | 11/2015 | McBride et al. | |
| 2016/0149771 A1 | 5/2016 | Prasad et al. | |
| 2017/0329639 A1* | 11/2017 | Morper | G06F 9/5005 |
| 2017/0331669 A1* | 11/2017 | Ganesh | H04L 41/0226 |

* cited by examiner

SERVICE CREATION WITHIN A TELECOMMUNICATIONS NETWORK IN ORDER TO PROVIDE AUTOMATED COMMUNICATION SERVICES TO CLIENT DEVICES BEING CONNECTED TO THE TELECOMMUNICATIONS NETWORK

CROSS-REFERENCE TO RELATED APPLICATIONS

Priority is claimed to European Patent Application No. EP 16 190 318.2, filed on Sep. 23, 2016, the entire disclosure of which is hereby incorporated by reference herein.

FIELD

The present invention relates a method for improved service creation within a telecommunications network in order to provide automated communication services to client devices being connected to the telecommunications network, wherein the telecommunications network comprises at least one access network, the at least one access network comprising a plurality of physical access resources and/or providing the possibility, to a plurality of client devices, to wirelessly access the telecommunications network.

Furthermore, the present invention relates to a telecommunications network for improved service creation within the telecommunications network in order to provide communication services to client devices being connected to the telecommunications network, wherein the telecommunications network comprises at least one access network, the at least one access network comprising a plurality of physical access resources and/or providing the possibility, to a plurality of client devices, to wirelessly access the telecommunications network.

Additionally, the present invention relates to a point of delivery and a system for improved service creation within a telecommunications network in order to provide communication services to client devices being connected to the telecommunications network, wherein the telecommunications network comprises at least one access network, the at least one access network comprising a plurality of physical access resources and/or providing the possibility, to a plurality of client devices, to wirelessly access the telecommunications network.

Furthermore, the present invention relates to a program and a computer program product for improved service creation within a telecommunications network in order to provide communication services to client devices being connected to the telecommunications network.

The present invention generally relates to the area of providing network access to client devices being connected to a telecommunications network in order to request communication services from the telecommunications network.

BACKGROUND

The exchange of packetized information in broadband communication systems or telecommunications networks, both in fixed-line as in wireless communication systems (or fixed-line communication networks and mobile communication networks) has already grown dramatically and probably will also grow in the future due to the rapid spread of different data services in such communication networks.

Typically, such client devices use a network connectivity link provided by a customer premises equipment device that connects the client device to a telecommunications network. Such network connectivity to a telecommunications network is typically required in order to provide internet-based services and applications to the client devices to fulfill people's needs in areas such as communication, banking, shopping, information, education and entertainment. Hence, high performance interne access solutions are an important prerequisite. Currently, in most cases, residential customers use wireline technologies (such as digital subscriber line (DSL) or Data Over Cable Service Interface Specification (DOCSIS)) for Internet access, whereas mobile customers use cellular technologies (such as Global System for Mobile Communications (GSM), Universal Mobile Telecommunications Service (UMTS) or Long-Term Evolution (LTE)).

However, the communication services also need to be created towards the client devices, i.e. a service profile as well as service parameters identified and applied in practice to the plurality of subscribers.

Conventional telecommunications networks are typically realized in a "BNG-centric" manner, i.e. the broadband network gateway (BNG) (or, rather, the plurality thereof) is an important network element relating to service creation. E.g., the customers or subscribers are identified by her/his user credentials based on PPP (point-to-point protocol) or DHCP (Dynamic Host Configuration Protocol)-based session detection. In such conventional telecommunications networks, the interaction between BNG and RADIUS server controls the service creation, cf. e.g. BBF TR-178. This leads to a single edge approach, hampering the sharing of resources and especially the realization of network slicing.

SUMMARY

In an exemplary embodiment, the present invention provides a method for improved service creation within a telecommunications network in order to provide automated communication services to client devices being connected to the telecommunications network. The telecommunications network comprises at least one access network, the at least one access network comprising a plurality of physical access resources and/or providing the possibility, to a plurality of client devices, to wirelessly access the telecommunications network. The telecommunications network furthermore comprises at least one point of delivery and at least one central database. Each physical access resource is assigned to a port identification information and/or each possibility to wirelessly access the telecommunications network involves the use of device identification information and/or of subscriber identity module identification information and/or of user identification information. The at least one point of delivery comprises a plurality of central access ports such that each of the plurality of physical access resources and/or possibilities to wirelessly access the telecommunications network corresponds to a specific central access port. Service creation and provisioning of communication services involves invoking virtual network functions within the at least one point of delivery. In order to perform the service creation and to assign a service profile to a specific client device—with respect to a specific one of the physical access resources and/or with respect to the specific client device attempting to wirelessly access the telecommunications network—a resource-up-message is required to be received by a corresponding specific central access port. The method includes the following steps: in a first step, the resource-up-message is received by the corresponding specific central access port of the at least one point of delivery; in a second step, subsequent to the first step, a lookup request is transmitted to the at least one central database, the lookup request comprising the port identification information of the specific physical access resource and/or the device identification information and/or the subscriber identity module identification information and/or the user identification information; and in a third step, subsequent to the second step, database response information is received by the at least one point of delivery, the database response information being related to customer identification information and/or to service attributes information of a communication service or a plurality of communication services to be configured, and wherein the virtual network functions, corresponding to the communication service or the plurality of communication services to be configured, are invoked within the at least one point of delivery.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Exemplary embodiments of the present invention provide a technically simple, effective and cost effective solution for improved service creation within a telecommunications network in order to provide automated communication services to client devices being connected to the telecommunications network. Exemplary embodiments of the present invention further provide a corresponding telecommunications network, a corresponding point of delivery, and a corresponding system.

In an exemplary embodiment, the present invention provides a method for improved service creation within a telecommunications network in order to provide automated communication services to client devices being connected to the telecommunications network,
wherein the telecommunications network comprises at least one access network, the at least one access network comprising a plurality of physical access resources and/or providing the possibility, to a plurality of client devices, to wirelessly access the telecommunications network,
wherein the telecommunications network furthermore comprises at least one point of delivery, and at least one central database,
wherein each physical access resource is assigned to port identification information and/or
wherein each possibility to wirelessly access the telecommunications network involves the use of device identification information and/or of subscriber identity module identification information and/or of user identification information,
wherein the at least one point of delivery comprises a plurality of central access ports such that each of the plurality of physical access resources and/or possibilities to wirelessly access the telecommunications network corresponds to a specific central access port,
wherein service creation and provisioning of communication services involves invoking virtual network functions within the point of delivery, wherein in order to perform such service creation and to assign a service profile to a specific client device—with respect to a specific one of the physical access resources and/or with respect to the specific client device attempting to wirelessly access the telecommunications network—a resource-up-message is required to be received by the corresponding specific central access port,
wherein the method comprises the following steps:
in a first step, the resource-up-message is received by the corresponding specific central access port of the point of delivery,
in a second step, subsequent to the first step, a lookup request is transmitted to the at least one central database, the lookup request comprising the port identification information of the specific physical access resource and/or the device identification information and/or the subscriber identity module identification information and/or the user identification information,
in a third step, subsequent to the second step, database response information is received by the point of delivery, the database response information being related to customer identification information and/or to service attributes information of the communication service or the plurality of communication services to be configured, and wherein the virtual network functions, corresponding to the communication service or the plurality of communication services to be configured, are invoked within the point of delivery.

It is thereby advantageously possible according to the present invention that the possibilities of sharing of network resources and especially the realization of network slicing are greatly enhanced. Thereby, it is advantageously possible according to the present invention that upcoming demands on network slicing can be more easily met.

Additionally, it is advantageously possible, in an exemplary embodiment of the present invention, to provide a unified, simplified and robust possibility for auto provisioning and auto learning of multiple access types such as DSL, PON, eNodeBs, WiFi Access points.

It is especially advantageous according to the present invention to be able to also auto-detect and provision mobile site gateways such as base station entities of mobile communication networks, such as eNodeBs.

Additionally, the present invention provides for using a software defined network, virtualized access components and service delivery in context of 5G and/or CORD to be able to realize the advantages mentioned. According to the present invention, a new way of service delivery by using fundamentals of listed references is provided.

The present invention relates to service creation in order to provide automated communication services to client devices being connected to a telecommunications network. Typically such telecommunications networks comprise at least one access network, and the at least one access network comprise a plurality of physical access resources and/or providing the possibility, to a plurality of client devices, to wirelessly access the telecommunications network. In conventional telecommunications networks, often a fixed line access network has been separated from the (mobile) access network of a mobile communication network.

A client device can be any communication device that is able to be connected to the telecommunications network (via any access network), such as home gateway or customer premises equipment device (i.e. a hardware device, providing the connectivity towards the telecommunications network, which other devices are locally connected to), a personal portable or desktop computing device, a (video or audio) streaming device, a television device, a smart phone, a tablet computing device, or any other device that is connectable either using a wireline or cable connection, or by using a wireless link such as a WLAN (wireless local area network) or WiFi connection, a Bluetooth connection or any other low range or cellular wireless access technology. In case a fixed line internet protocol access is used towards the telecommunications network (such as a digital subscriber line or fixed line access using an optical communication network), the client device typically corresponds to the home gateway or customer premises equipment device. In case a connectivity to a mobile communication network is used, the client devices are typically the communication devices themselves, such as a personal portable, a (video or audio) streaming device, a smart phone, a tablet computing device.

According to the present invention, the situation is considered that the telecommunications network especially comprises access networks, or parts thereof, of different types, such as fixed line access networks as well as mobile access networks. Fixed line access networks typically provide a plurality of physical access resources, normally in the form of physical access line resources. Access networks of mobile communication networks (hereinafter also called mobile access networks) typically provide the possibility, to a plurality of client devices (typically user equipments within a mobile communication network), to wirelessly access the telecommunications network, but do normally not have physical access line resources dedicated to specific customers or subscribers of the telecommunications network.

Furthermore according to the present invention, the telecommunications network comprises—besides at least one central database—at least one point of delivery. The point of delivery is especially a central office point of delivery, however, the point of delivery does not necessarily be located in the central office (or in locations typically used for central offices). It is—according to one variant of locating points of delivery—conceivable to locate the points of delivery (or at least parts thereof) in increased proximity to the access resources of the access network (compared to locating the point of delivery at a conventional central office location). Likewise, it is conceivable—according to another variant of locating points of delivery—to locate the points of delivery (or at least parts thereof) further away from the access resources of the access network (compared to locating the point of delivery at a conventional central office location). Additionally, it is also possible to mix both variants in different parts of the access network considered.

According to the present invention, each physical access resource is assigned to port identification information and/or each possibility to wirelessly access the telecommunications network involves the use of device identification information and/or of subscriber identity module identification information and/or of user identification information. This essentially means that the physical access resources typically found in a fixed line access network are assigned to port identification information, respectively, whereas in a mobile access network no such port identification information is meaningful; hence, the need to identify the access (by user equipments or other mobile clients or mobile devices) to the mobile access network via device-related and/or user-related and/or subscriber-related and/or SIM card- or SIM module-related identifiers.

Furthermore according to the present invention, the at least one point of delivery comprises a plurality of central access ports such that each of the plurality of physical access resources and/or possibilities to wirelessly access the telecommunications network corresponds to a specific central access port, and the service creation and provisioning of communication services involves invoking virtual network functions within the point of delivery, wherein in order to perform such service creation and to assign a service profile to a specific client device—with respect to a specific one of the physical access resources and/or with respect to the specific client device attempting to wirelessly access the telecommunications network—a resource-up-message is required to be received by the corresponding specific central access port. By using such resource-up-messages for the service creation of any access resource, it is advantageously possible to apply a uniform handling for service creation, independently of whether the corresponding access resource relates to a fixed line access or to a mobile access.

According to the method of the present invention, in a first step, the resource-up-message is received by the corresponding specific central access port of the point of delivery. In a second step, subsequent to the first step, a lookup request is transmitted to the at least one central database, the lookup request comprising the port identification information of the specific physical access resource and/or the device identification information and/or the subscriber identity module identification information and/or the user identification information. In a third step, subsequent to the second step, database response information is received by the point of delivery, the database response information being related to customer identification information and/or to service attributes information of the communication service or the plurality of communication services to be configured, and wherein the virtual network functions, corresponding to the communication service or the plurality of communication services to be configured, are invoked within the point of delivery.

The telecommunications network according to the present invention might be a fixed-line telecommunications network or a mobile communication network but preferably is a telecommunications network having both aspects (or parts) of a fixed-line telecommunications network (or being a fixed-line telecommunications network in such parts) and aspects (or parts) of a mobile communication network (or being a mobile communication network in such parts); such networks are also known under the term fixed-mobile-convergence networks (FMC networks).

According to a preferred embodiment of the present invention, the specific physical access resource and/or a device connected to the specific physical access resource and/or the specific client device attempting to wirelessly access the telecommunications network act as an access-node-control-protocol client, and wherein the specific central access port within the point of delivery acts as an access-node-control-protocol server or proxy.

Thereby, it is advantageously possible that to realize the auto-provisioning functionality according to the present invention. Furthermore, it is to be understood that more than two connection paths are able to be realized according to the present invention.

According to a further alternative embodiment of the present invention, the port identification information of the specific physical access resource and/or the device identification information and/or the subscriber identity module identification information and/or the user identification information are used to implicitly authenticate the client device or the subscriber, especially based on physical port-related information inserted by the access-node-control-protocol client.

Thereby, it is advantageously possible according to the present invention to apply automated service creation.

Furthermore, according to an embodiment of the present invention, the central access ports within the point of delivery are software-defined-network-based central access ports such that the service creation is independent from a customer session.

According to a further embodiment of the present invention, at least one type-length-value element, related to using the access-node-control-protocol, is used, wherein the type-length-value element refers to a data transmission tunnel used to transmit Netconf/Yang-related data and/or wherein the type-length-value element refers to a data transmission tunnel used to transmit OpenFlow-related data.

According to still a further embodiment of the present invention, at least one type-length-value element, related to using the access-node-control-protocol, is used, wherein the type-length-value element refers to WiFi property data.

Additionally, according to a further embodiment of the present invention, a wireless internet-of-things device acts as a supplicant, and wherein a WiFi access points or Small cell access points acts as an access-node-control-protocol client and a point of delivery acts as server or proxy.

Additionally, according to a further embodiment of the present invention, network slices are set up, especially automatically set up, by using the access-node-control-protocol to partition WiFi access points or Small Cell access points and related links to point of delivery.

Furthermore, the present invention relates to a telecommunications network for improved service creation within the telecommunications network in order to provide communication services to client devices being connected to the telecommunications network,
wherein the telecommunications network comprises at least one access network, the at least one access network comprising a plurality of physical access resources and/or providing the possibility, to a plurality of client devices, to wirelessly access the telecommunications network,
wherein the telecommunications network furthermore comprises at least one point of delivery, and at least one central database,
wherein each physical access resource is assigned to port identification information and/or
wherein each possibility to wirelessly access the telecommunications network involves the use of device identification information and/or of subscriber identity module identification information and/or of user identification information,
wherein the at least one point of delivery comprises a plurality of central access ports such that each of the plurality of physical access resources and/or possibilities to wirelessly access the telecommunications network corresponds to a specific central access port,
wherein service creation and provisioning of communication services involves invoking virtual network functions within the point of delivery, wherein in order to perform such service creation and to assign a service profile to a specific client device—with respect to a specific one of the physical access resources and/or with respect to the specific client device attempting to wirelessly access the telecommunications network—a resource-up-message is required to be received by the corresponding specific central access port,
wherein the telecommunications network is configured such that:
the resource-up-message is received by the corresponding specific central access port of the point of delivery,
a lookup request is transmitted to the at least one central database, the lookup request comprising the port identification information of the specific physical access resource and/or the device identification information and/or the subscriber identity module identification information and/or the user identification information,
database response information is received by the point of delivery, the database response information being related to customer identification information and/or to service attributes information of the communication service or the plurality of communication services to be configured, and wherein the virtual network functions, corresponding to the communication service or the plurality of communication services to be configured, are invoked within the point of delivery.

Furthermore, the present invention relates to a point of delivery for improved service creation within a telecommunications network in order to provide communication services to client devices being connected to the telecommunications network,
wherein the telecommunications network comprises at least one access network, the at least one access network comprising a plurality of physical access resources and/or providing the possibility, to a plurality of client devices, to wirelessly access the telecommunications network,
wherein the telecommunications network furthermore comprises at least one point of delivery, and at least one central database,
wherein each physical access resource is assigned to port identification information and/or
wherein each possibility to wirelessly access the telecommunications network involves the use of device identification information and/or of subscriber identity module identification information and/or of user identification information,
wherein the at least one point of delivery comprises a plurality of central access ports such that each of the plurality of physical access resources and/or possibilities to wirelessly access the telecommunications network corresponds to a specific central access port,
wherein service creation and provisioning of communication services involves invoking virtual network functions within the point of delivery, wherein in order to perform such service creation and to assign a service profile to a specific client device—with respect to a specific one of the physical access resources and/or with respect to the specific client device attempting to wirelessly access the telecommunications network—a resource-up-message is required to be received by the corresponding specific central access port,
wherein the point of delivery is configured such that:
the resource-up-message is received by the corresponding specific central access port of the point of delivery,
a lookup request is transmitted to the at least one central database, the lookup request comprising the port identification information of the specific physical access resource and/or the device identification information and/ or the subscriber identity module identification information and/or the user identification information, database response information is received by the point of delivery, the database response information being related to customer identification information and/or to service attributes information of the communication service or the plurality of communication services to be configured, and wherein the virtual network functions, corresponding to the communication service or the plurality of communication services to be configured, are invoked within the point of delivery.

Additionally, the present invention relates to a system for improved service creation within a telecommunications network in order to provide communication services to client devices being connected to the telecommunications network, wherein the system comprises the telecommunications network with the point of delivery, wherein the telecommunications network comprises at least one access network, the at least one access network comprising a plurality of physical access resources and/or providing the possibility, to a plurality of client devices, to wirelessly access the telecommunications network, wherein the telecommunications network furthermore comprises at least one point of delivery, and at least one central database, wherein each physical access resource is assigned to port identification information and/or wherein each possibility to wirelessly access the telecommunications network involves the use of device identification information and/or of subscriber identity module identification information and/or of user identification information, wherein the at least one point of delivery comprises a plurality of central access ports such that each of the plurality of physical access resources and/or possibilities to wirelessly access the telecommunications network corresponds to a specific central access port, wherein service creation and provisioning of communication services involves invoking virtual network functions within the point of delivery, wherein in order to perform such service creation and to assign a service profile to a specific client device—with respect to a specific one of the physical access resources and/or with respect to the specific client device attempting to wirelessly access the telecommunications network—a resource-up-message is required to be received by the corresponding specific central access port, wherein the system is configured such that:

the resource-up-message is received by the corresponding specific central access port of the point of delivery, a lookup request is transmitted to the at least one central database, the lookup request comprising the port identification information of the specific physical access resource and/or the device identification information and/or the subscriber identity module identification information and/or the user identification information, database response information is received by the point of delivery, the database response information being related to customer identification information and/or to service attributes information of the communication service or the plurality of communication services to be configured, and wherein the virtual network functions, corresponding to the communication service or the plurality of communication services to be configured, are invoked within the point of delivery.

Still additionally, the present invention relates to a program comprising a computer readable program code which, when executed on a point of delivery and/or on a network function within a point of delivery, or in part on a point of delivery and/or in part on a network function within a point of delivery, causes the computer and/or the point of delivery and/or the network function within a point of delivery to perform the inventive method.

Furthermore, the present invention relates to a computer program product for improved service creation within a telecommunications network in order to provide communication services to client devices being connected to the telecommunications network, the computer program product comprising a computer program stored on a storage medium, the computer program comprising program code which, when executed on a point of delivery and/or on a network function within a point of delivery, or in part on a point of delivery and/or in part on a network function within a point of delivery, causes the computer and/or the point of delivery and/or the network function within a point of delivery to perform the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
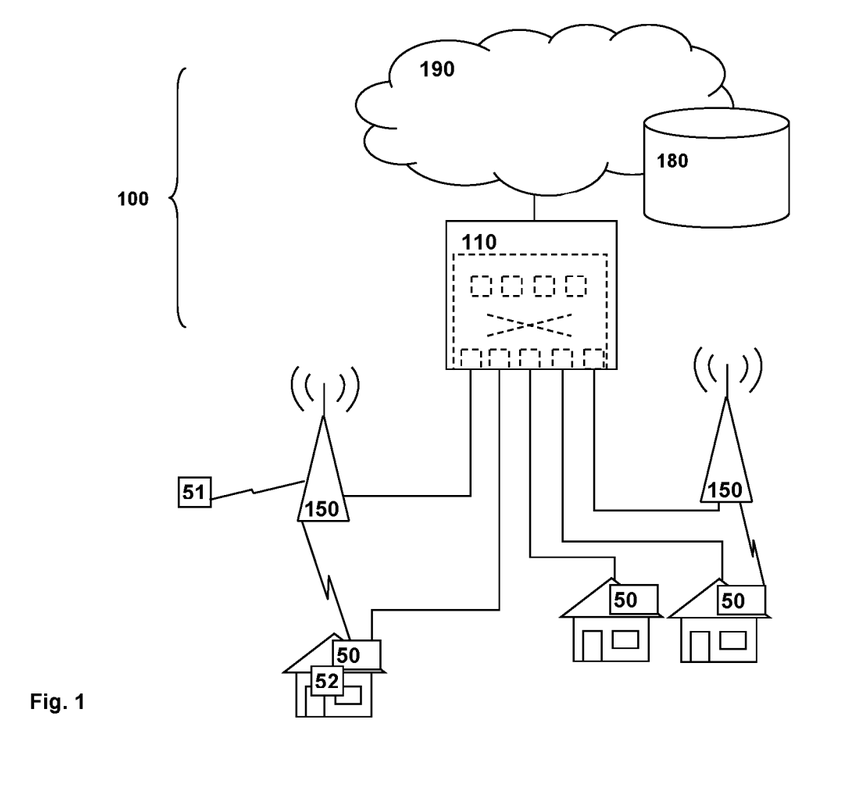
FIG. 1 schematically illustrates a telecommunications network according to the present invention, having a fixed line part and a mobile (or cellular) part, and, hence, providing the possibility for user equipments or client devices to use different access technologies, wherein a logical or physical central office point of delivery is handling different access possibilities.

In FIG. 1, a telecommunications network 100 according to the present invention is schematically shown, having a fixed line part and a mobile (or cellular) part (schematically illustrated via base station entities 150), and, hence, providing the possibility for user equipments or client devices 51, 52 and/or customer premises equipment devices 50 to use different access technologies. The telecommunications network 100 comprises at least one point of delivery 110 that is preferably realized within a data center and that is handling different access possibilities of the client devices 50, 51, 52 to network functionalities 190 provided by the telecommunications network 100 or via the telecommunications network 100. The client devices 50, 51, 52 are connected to the point of delivery 110.

Figure 2:
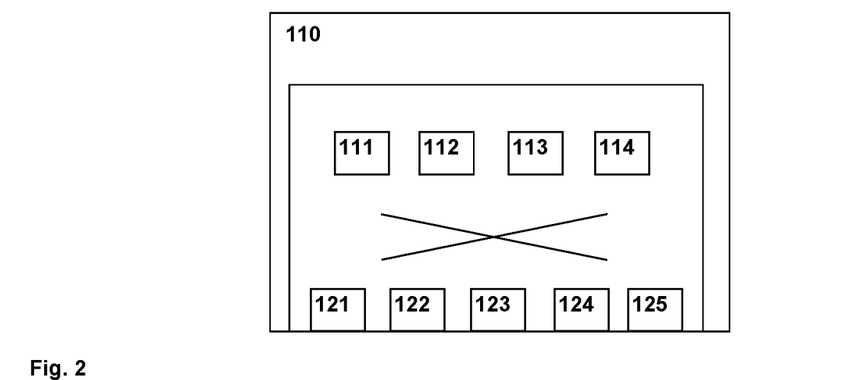
FIG. 2 schematically illustrates a logical or physical central office point of delivery.

FIG. 2 schematically illustrates a point of delivery 110, especially comprising a plurality of access ports 121, 122, 123, 124, 125. Typically, these access ports 121, 122, 123, 124, 125 are provided to connect the point of delivery 110 to customer access lines. However, one or a plurality of these access ports 121, 122, 123, 124, 125 can also be provided to connect the point of delivery 110 to the backbone network or the wide area network. Furthermore, the point of delivery 110 comprises network functions 111, 112, 113, 114, especially realized as virtual network functions (also called VNF). Such network functions or virtual network functions 111, 112, 113, 114, e.g., realize internet protocol edge devices or internet protocol edge device functionalities such as, e.g., packet gateway (P-GW) functionalities and/or broadband network gateway (BNG) functionalities.

According to the present invention, it is advantageously possible to provide a new way of service delivery by using fundamentals of listed references.

Furthermore, an end-to-end design is provided, taking the physical port trigger in order to set up (or create) the communication service. This is independent from a customer session but depends on port set up and activation.

The access ports 121, . . . , 125 of the point of delivery 110 connect to the client devices 50, 51, 52 either directly (physically) or in an aggregated manner (i.e. by intermediate nodes such as MSAN or DPU to access ports). Access-node-control-protocol clients or server/proxy are provided depending on the use case in different elements. The ANCP protocol may tunnel NetConf/OpenFlow (or other related protocols).

According to the present invention, it is advantageously possible to realize the detection of a device being connected to an access line and the triggering of an auto-provisioning process based on Port-Up messages in ANCP, Automated Service creation based on Port-Up Message-based detection, and Automatic establishment of tunnels for management and control of the client devices.

Conventionally, protocols such as Netconf/Yang is used for provisioning and OpenFlow for dynamically setting service specific configurations. This conventionally requires two IP sessions which both need to be monitored. The ANCP protocol is able to provide a solution to this issue (i.e. instead of using IP mechanisms), because the ANCP protocol already has an adjacency mechanism which provides for service monitoring of the connection between access node and service gateway. Furthermore, via the ability to partition an access node (by ANCP), the use of the ANCP protocol helps setting up network slices. Hence, according to the present invention, at least one type-length-value element (TLV), related to using the access-node-control-protocol, is used, wherein the type-length-value element refers to a data transmission tunnel used to transmit Netconf/Yang-related data and/or wherein the type-length-value element refers to a data transmission tunnel used to transmit OpenFlow-related data.

According to the present invention, also Small Cells/WiFi Access points are connected to fixed line systems but not any more assigned to a single access line resource. Therefore also WiFi and Small cells need to send a "Resource Up" message to be assigned by the service creation. On top of that, individual customer sessions may be transmitted, but the basic resource needs to be known by the service gateway for processing access.

Typically, the device in the customer premises runs the ANCP client and creates port-up messages, triggered by other devices connected to this device. In another embodiment, the ANCP client may reside in the access port and is being triggered by any kind of event caused by the SC/WiFi device.

This is also used in case of wireless internet-of-things devices need resource control. In that case, the ANCP client in the WiFi hotspot corresponds to ANCP server at the point of delivery.

According to the present invention, service creation is provided as follows: The reception of a port up message leads to a lookup in the central database 180. This lookup request contains the port ID which may be either provisioned by (e.g. ANCP TLV2) or a physical port ID (e.g. ANCP TLV1) or both in combination. It could also be a different ID which may be derived from mobile networks.

In the database 180, there is the information of the port ID to customer ID and service attributes. The match of that lookup provides the setup of a virtual network function (vNF) in the service gateway (or point of delivery 110) and the provisioning of the service. Examples of such virtual network functions include, e.g.:

vNF1: residential service (e.g. PPP based dial in as today)
vNF2: Broadcast/Multicast
vNF3: wholesale/VULA
vNF4: E-Tree as per MEF (SME)
vNF5: E-Line as per MEF (SME)
vNFn:

Instead of a single VNF, a full service graph (i.e. a plurality of virtual network functions) may become established upon receiving the port-up message. This provides the basic mechanism 5G fixed network slicing is looking as the service graph may reside in or implicitly create a network slice.

As an example, the following procedure is provided:
1. PON ONU physically connected to OLT at access port; ANCP client of the access port is able to reach ANCP proxy on IP layer,
2. A-PORT detects ONU and ONU send port-up message including port information
3. ANCP server receives message and triggers backend systems to
  a. Load profile
  b. Establish user plane path in the POD and activate polices according to profile
  c. Invoke any required VNFs and/or configure them
  d. Set up tunnels over ANCP connection to carry Netconf and OpenFlow towards the A-Port (OLT) in order to allow for multiple tenants
  e. Establish a proxy to either relay NetConf/Yang and OpenFlow messages between ONT and OLT or transpose into other protocols (e.g. OMCI).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for service creation within a telecommunications network in order to provide automated communication services to client devices connected to the telecommunications network, the method comprising:
receiving, by a point of delivery of the telecommunications network, a resource-up-message via a specific central access port of the point of delivery, wherein the point of delivery comprises a plurality of central access ports, and wherein the specific central access port corresponds to:
a specific physical access resource assigned to port identification information; and/or
a possibility to wirelessly access the telecommunications network based on device identification information, subscriber identity module identification information, and/or user identification information;
in response to reception of the resource-up-message at the point of delivery, transmitting a lookup request to a central database of the telecommunications network for performing a lookup in the central database, wherein the lookup request comprises: the port identification information of the specific physical access resource, the device identification information, the subscriber identity module identification information, and/or the user identification information;
after transmitting the lookup request, receiving, by the point of delivery, database response information, wherein the database response information is related to customer identification information and/or service attributes information of a communication service or a plurality of communication services to be configured; and
provisioning the communication service or the plurality of communication services, performing service creation, and assigning a service profile to a specific client device, wherein the provisioning comprises: invoking, within the point of delivery, virtual network functions corresponding to the communication service or the plurality of communication services to be configured, wherein the invoked virtual network functions realize internet protocol edge devices or internet protocol edge device functionalities;
wherein the port identification information of the specific physical access resource, the device identification information, the subscriber identity module identification information, and/or the user identification information are used to implicitly authenticate the specific client device or a subscriber, wherein the authentication is based on physical port-related information inserted by an access-node-control-protocol client.

2. The method according to claim 1, wherein the specific physical access resource, a device connected to the specific physical access resource and/or the specific client device act as an access-node-control-protocol client, and wherein the specific central access port of the point of delivery acts as an access-node-control-protocol server or proxy.

3. The method according to claim 1, wherein the central access ports of the point of delivery are software-defined-network-based central access ports such that the service creation is independent from a customer session.

4. The method according to claim 1, wherein at least one type-length-value element, related to using the access-node-control-protocol, is used, wherein the at least one type-length-value element refers to a data transmission tunnel used to transmit Netconf/Yang-related data and/or wherein the at least one type-length-value element refers to a data transmission tunnel used to transmit OpenFlow-related data.

5. The method according to claim 1, wherein at least one type-length-value element, related to using the access-node-control-protocol, is used, wherein the at least one type-length-value element refers to WiFi property data.

6. The method according to claim 1, wherein a wireless internet-of-things device acts as a supplicant, and wherein WiFi access points or small cell access points act as an access-node-control-protocol client and the point of delivery acts as server or proxy.

7. The method according to claim 1, wherein network slices are automatically set up by using the access-node-control-protocol to partition WiFi access points or small cell access points and related links to the point of delivery.

8. A system for service creation within a telecommunications network in order to provide communication services to client devices connected to the telecommunications network, wherein the system comprises:
at least one point of delivery;
at least one central database; and
at least one access network, wherein:
the at least one access network comprises a plurality of physical access resources; and/or
the at least one access network provides possibilities to wirelessly access the telecommunications network;
wherein the at least one point of delivery comprises a plurality of central access ports;
wherein a specific central access port of the at least one point of delivery is configured to receive a resource-up-message, wherein the specific central access port corresponds to:
a specific physical access resource assigned to port identification information; and/or
a possibility to wirelessly access the telecommunications network based on device identification information, subscriber identity module identification information, and/or user identification information;
wherein the at least one central database is configured to receive a lookup request for performing a lookup in the at least one central database, wherein the lookup request is in response to reception of the resource-up-message at the at least one point of delivery, and wherein the lookup request comprises the port identification information of the specific physical access resource, the device identification information, the subscriber identity module identification information, and/or the user identification information;
wherein the at least one point of delivery is configured to receive database response information, wherein the database response information is related to customer identification information and/or service attributes information of a communication service or a plurality of communication services to be configured;
wherein the at least one point of delivery is configured to invoke virtual network functions, corresponding to the communication service or the plurality of communication services to be configured, for provisioning the communication service or the plurality of communication services, performing service creation, and assigning a service profile to a specific client device, wherein the invoked virtual network functions realize internet protocol edge devices or internet protocol edge device functionalities; and wherein network slices are automatically set up by using the access-node-control-protocol to partition WiFi access points or small cell access points and related links to the at least one point of delivery.

9. One or more non-transitory computer-readable mediums having processor-executable instructions stored thereon for service creation within a telecommunications network in order to provide automated communication services to client devices connected to the telecommunications network, wherein the processor-executable instructions, when executed, facilitate:

receiving, by a point of delivery of the telecommunications network, a resource-up-message via a specific central access port of the point of delivery, wherein the point of delivery comprises a plurality of central access ports, and wherein the specific central access port corresponds to:

a specific physical access resource assigned to port identification information; and/or a possibility to wirelessly access the telecommunications network based on device identification information, subscriber identity module identification information, and/or user identification information;

in response to reception of the resource-up-message at the point of delivery, transmitting a lookup request to a central database of the telecommunications network for performing a lookup in the central database, wherein the lookup request comprises: the port identification information of the specific physical access resource, the device identification information, the subscriber identity module identification information, and/or the user identification information;

after transmitting the lookup request, receiving, by the point of delivery, database response information, wherein the database response information is related to customer identification information and/or service attributes information of a communication service or a plurality of communication services to be configured; and provisioning the communication service or the plurality of communication services, performing service creation, and assigning a service profile to a specific client device, wherein the provisioning comprises: invoking, within the point of delivery, virtual network functions corresponding to the communication service or the plurality of communication services to be configured, wherein the invoked virtual network functions realize internet protocol edge devices or internet protocol edge device functionalities;

wherein the port identification information of the specific physical access resource, the device identification information, the subscriber identity module identification information, and/or the user identification information are used to implicitly authenticate the specific client device or a subscriber, wherein the authentication is based on physical port-related information inserted by an access-node-control-protocol client.

* * * * *